(12) United States Patent
Chen

(10) Patent No.: US 9,927,631 B2
(45) Date of Patent: Mar. 27, 2018

(54) INTERCHANGEABLE FRAME FOR EYEGLASSES

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 46 days.

(21) Appl. No.: 15/156,511

(22) Filed: May 17, 2016

(65) Prior Publication Data

US 2017/0336648 A1 Nov. 23, 2017

(51) Int. Cl.
*G02C 5/00* (2006.01)
*G02C 5/12* (2006.01)

(52) U.S. Cl.
CPC .............. *G02C 5/00* (2013.01); *G02C 5/126* (2013.01); *G02C 2200/08* (2013.01)

(58) Field of Classification Search
CPC . G02C 5/00; G02C 5/126; G02C 1/08; G02C 1/10; G02C 2200/08
USPC .......................... 351/138, 90, 97, 88, 98, 136
See application file for complete search history.

(56) References Cited

U.S. PATENT DOCUMENTS

| | | | | |
|---|---|---|---|---|
| 5,227,817 A | * | 7/1993 | Simioni | A61F 9/025 351/138 |
| 6,719,425 B2 | * | 4/2004 | Conner | G02C 1/02 16/228 |
| 7,594,723 B2 | * | 9/2009 | Jannard | G02C 1/04 351/106 |
| 2016/0178926 A1 | * | 6/2016 | Leung | G02C 1/02 351/110 |

* cited by examiner

*Primary Examiner* — Ricky Mack
*Assistant Examiner* — Kristina Deherrera
(74) *Attorney, Agent, or Firm* — Rosenberg, Klein & Lee

(57) ABSTRACT

An interchangeable frame for eyeglasses comprises an upper frame and a lower frame, which are respectively formed corresponding lens-assembling portions. The connection site between the upper frame and the lower frame has a connection block and a connection notch, corresponded to connect to each other, and the both sides of the connection block and the connection notch have a ditch and a flange, engaging upon each other, making the upper frame and the lower frame connect to form in one. Therefore, according to the required, the upper frame and the lower frame can be assembled and disassembled freely to form the semi-rim eyeglasses or the full-rim eyeglasses.

3 Claims, 5 Drawing Sheets

INTERCHANGEABLE FRAME FOR EYEGLASSES

BACKGROUND OF THE INVENTION

Field of the Invention

The present invention relates to an interchangeable frame for eyeglasses. More particularly, according to the required, an upper frame and a lower frame of an interchangeable frame for eyeglasses can be assembled and disassembled freely to form the semi-rim eyeglasses or the full-rim eyeglasses.

Description of Related Art

The general glasses are divided into optical glasses, sunglasses, sport spectacles, and safety glasses, according to their uses and function. The frame design of different type of the glasses is different. For example, in the full-rim glasses, the lens is all received in the frame to protect the safety of the lens, so the full-rim glasses are used in optical glasses. However, the semi-rim glasses are lighter than the full-rim glasses, so it is used in sunglasses, sports spectacles, and safety glasses, which emphasis in light weight and well-executed, for user doing outside exercise or construction.

Because the things that everyone likes and demands are different, it needs to display the all kinds of the semi-rim eyeglasses and the full-rim eyeglasses in the eyeglasses store for consumers choosing, increasing the operating cost. Furthermore, the eyeglasses are developed until now, in addition to the basic function such as vision protection or correction, it also becomes the important accessory for dressing up. For the users who like novel and changeable things, they usually buy the different type of eyeglasses frame such as full-rim type or semi-rim type to dress up for attending different occasion. For users who have the habit of wearing eyeglasses, they may have optical glasses and sunglasses according to the different uses, if they have demand for dressing up, they will buy the eyeglasses with different frame, such as semi-rim eyeglasses and full-rim eyeglasses, not only increasing the economic burden, but also causing storage distress. Moreover, when the several pairs of eyeglasses are left unused, it also results in resource-wasting.

SUMMARY OF THE INVENTION

Accordingly, the object of the present invention is related to an interchangeable frame for eyeglasses, according to the required, an upper frame and a lower frame of which interchangeable frame for eyeglasses can be assembled and disassembled freely to form the semi-rim eyeglasses or the full-rim eyeglasses.

For the above object, an interchangeable frame for eyeglasses comprises an upper frame and a lower frame. The upper frame comprises a middle section, two upper lens-assembling portions, a joining portion, a connection block, and two ditches. The two upper lens-assembling portions are respectively formed at the both sides of the middle section and opened at the lower portion of each upper lens-assembling portion. The joining portion is concavely formed at the front bottom of the middle section. The connection block is connected with the bottom of the joining portion. The two ditches are respectively formed at the both sides of the connection block. The lower frame comprises an inverted V-shaped assembling part, a connection notch, two flanges, and two lower lens-assembling portions. The inverted V-shaped assembling part is formed at the middle of the lower frame and connected with the joining portion of the upper frame. The connection notch is concavely formed at the upper end of the assembling part to connect with the connection block at the bottom of the joining portion. The two flanges are respectively formed at the both sides of the connection notch to engage in the ditches at the both sides of the connection block. The two lower lens-assembling portions are formed at the both sides of the assembling part and opened at the upper portion of each lower lens-assembling portion to pair with the two upper lens-assembling portions of the upper frame for forming a complete lens-assembling part.

According to an embodiment of the present invention, the upper frame further comprises an inverted V-shaped fastener and two nose stands. The inverted V-shaped fastener is set on the joining portion of the upper frame and formed with two first locking holes in the back of the fastener; and the two nose stands are set between the fastener and the connection block of the joining portion and formed with a second locking hole in the upper end of each nose stand. Furthermore, two third locking holes are formed in the middle section of the upper frame and corresponded to the back of the connection block of the joining portion, wherein the third locking holes are corresponded to the two first locking holes in the fastener and the second locking holes in the nose stands, whereby two latches are through the third locking holes in the middle section, the second locking holes in the nose stands, then screwed into the first locking holes in the fastener for fastening the nose stands and the fastener onto the middle section.

According to an embodiment of the present invention, the front end of each of the two nose stands is concavely formed with a gap for receiving each of the both sides of the inverted V-shaped fastener. Furthermore, the bottom of each of the both sides of the fastener is formed with a hole, and the top edge of the gap in each nose stand is respectively formed with a protrusion to correspond to the hole at the bottom of each of the both sides of the fastener for positioning.

Accordingly, according to the required, the interchangeable frame for eyeglasses can be freely changed to the semi-rim eyeglasses or the full-rim eyeglasses. For the consumers, they can just buy one eyeglasses frame to be able to change to the semi-rim eyeglasses or the full-rim eyeglasses, saving the cost in buying eyeglasses. Moreover, for the eyeglasses industry, when the eyeglasses are displayed for sale, it does not need to display all kinds of the semi-rim eyeglasses and the full-rim eyeglasses for consumers choosing, lightening the operating cost. Furthermore, the upper frame and the lower frame in the present invention can be different color and pattern for improving the fashion and trendy of the appearance, matching the market demand in innovation and changes.

DETAILED DESCRIPTION OF THE PREFERRED EMBODIMENT

Figure 1:
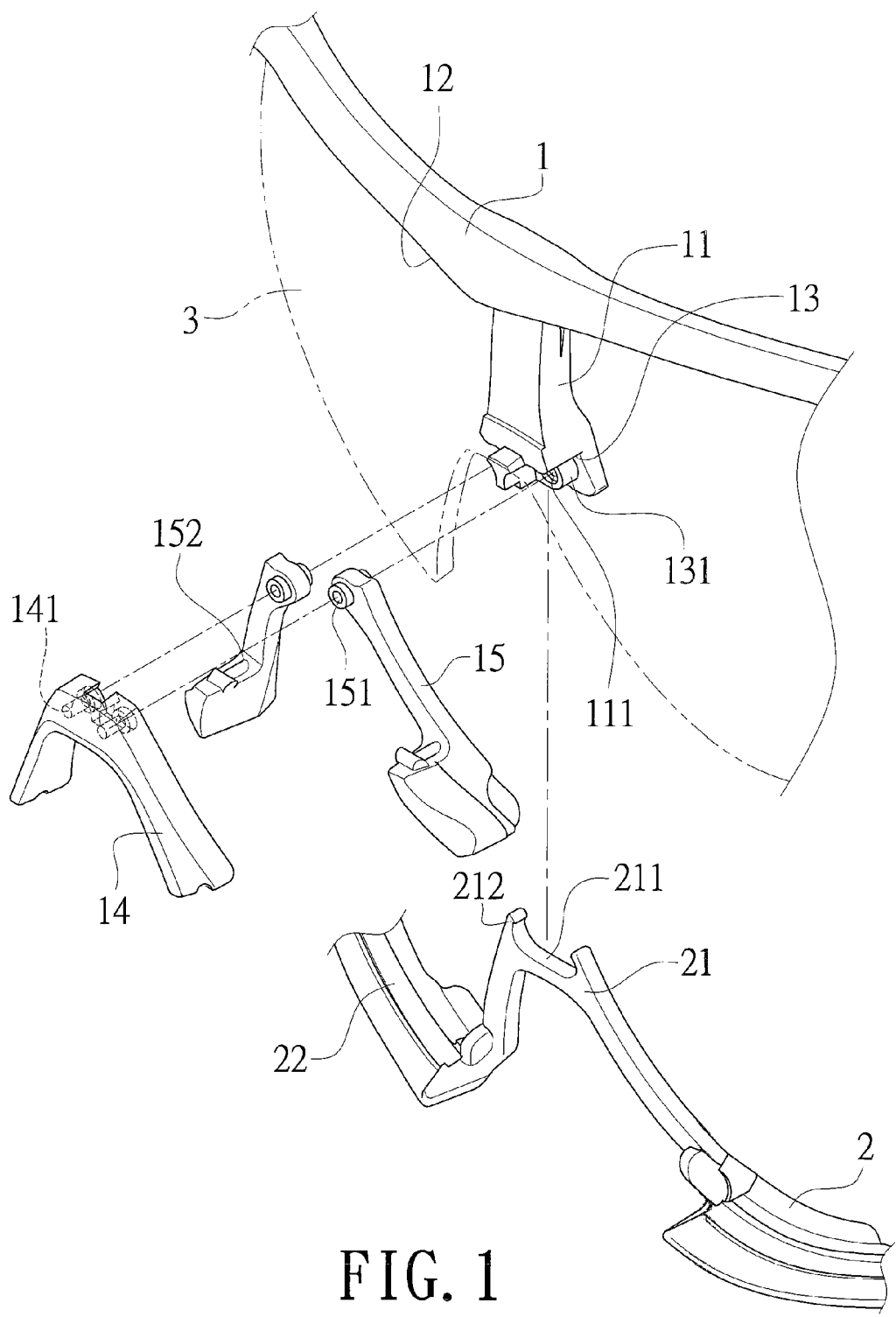
FIG. 1 is an exploded perspective front view of an interchangeable frame for eyeglasses according to an embodiment of the present invention.
Figure 2:
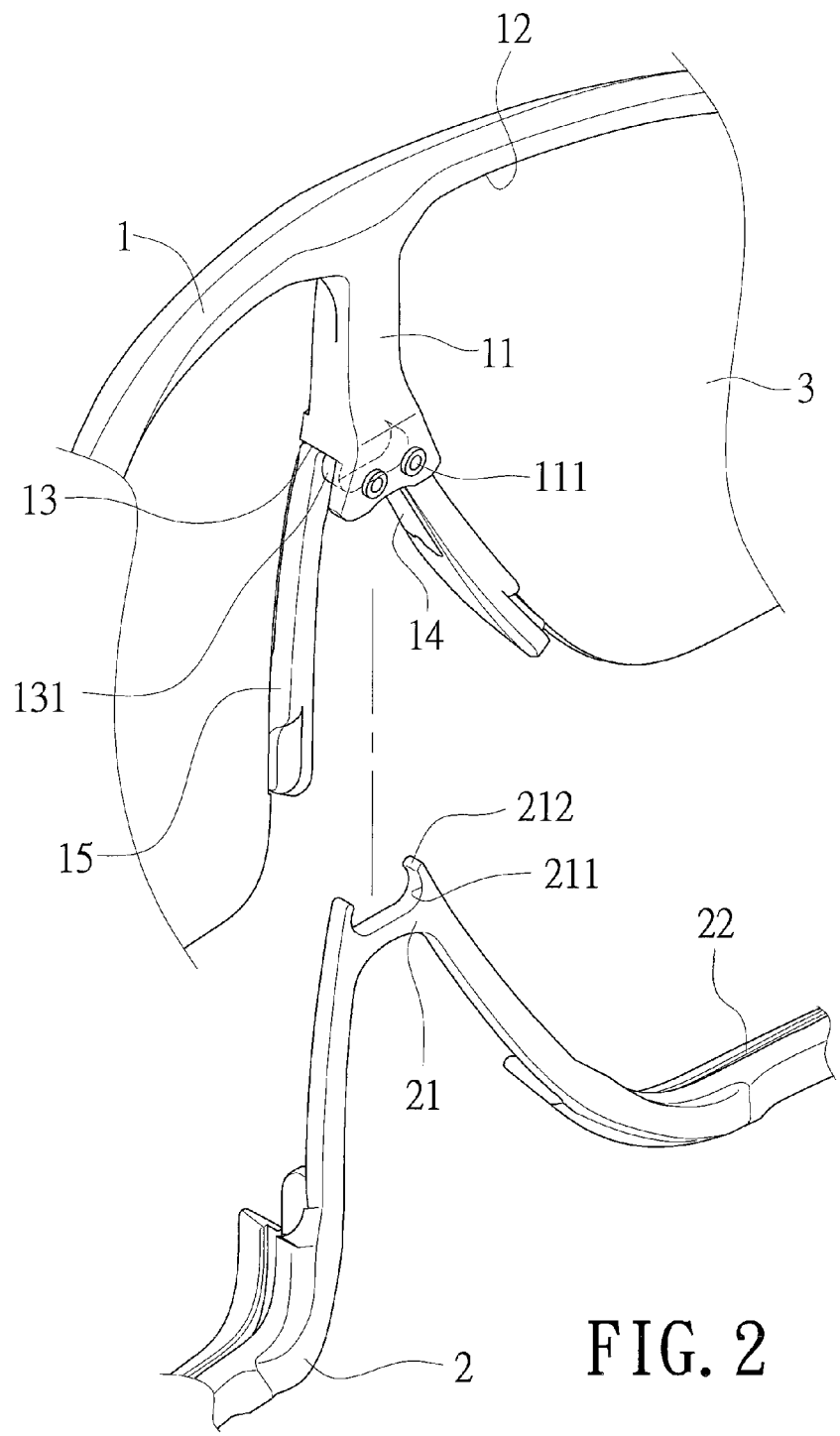
FIG. 2 is an exploded perspective back view of an interchangeable frame for eyeglasses according to an embodiment of the present invention.

Please refer to FIG. 1 and FIG. 2, which show the structure of an interchangeable frame for eyeglasses according to an embodiment of the present invention. The interchangeable frame for eyeglasses comprises an upper frame 1 and a lower frame 2.

Figure 3:
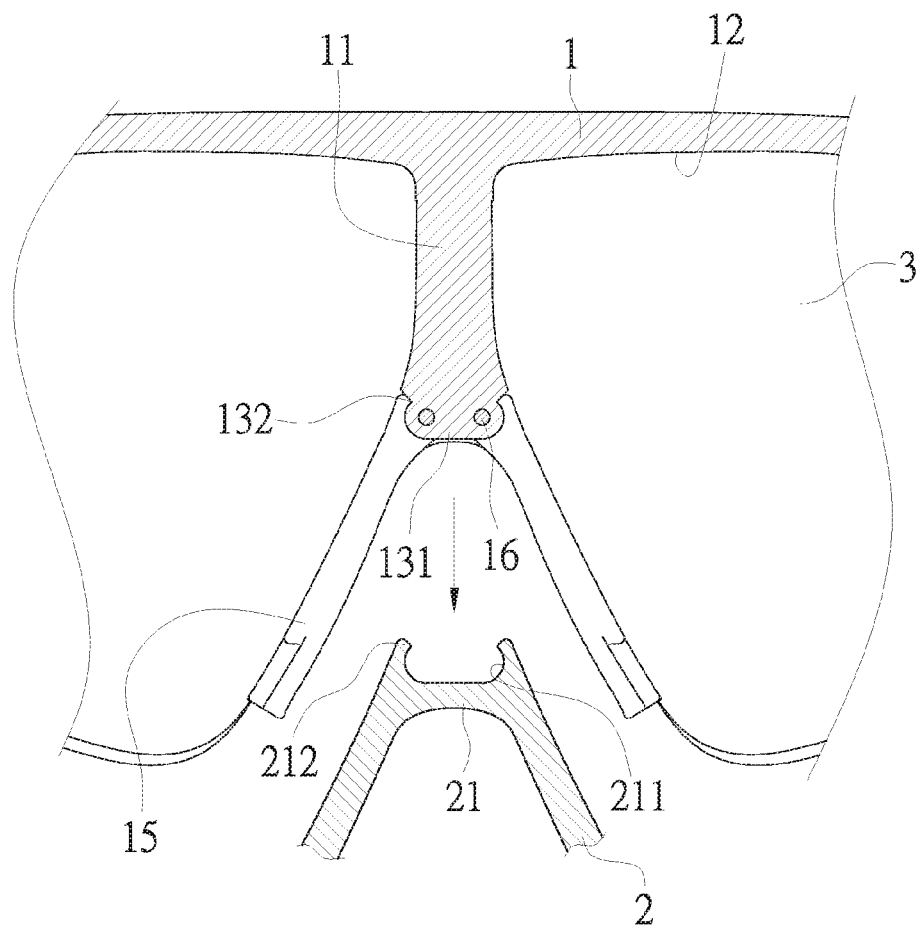
FIG. 3 is a diagram of an interchangeable frame for eyeglasses when it is assembled according to an embodiment of the present invention.
Figure 5:
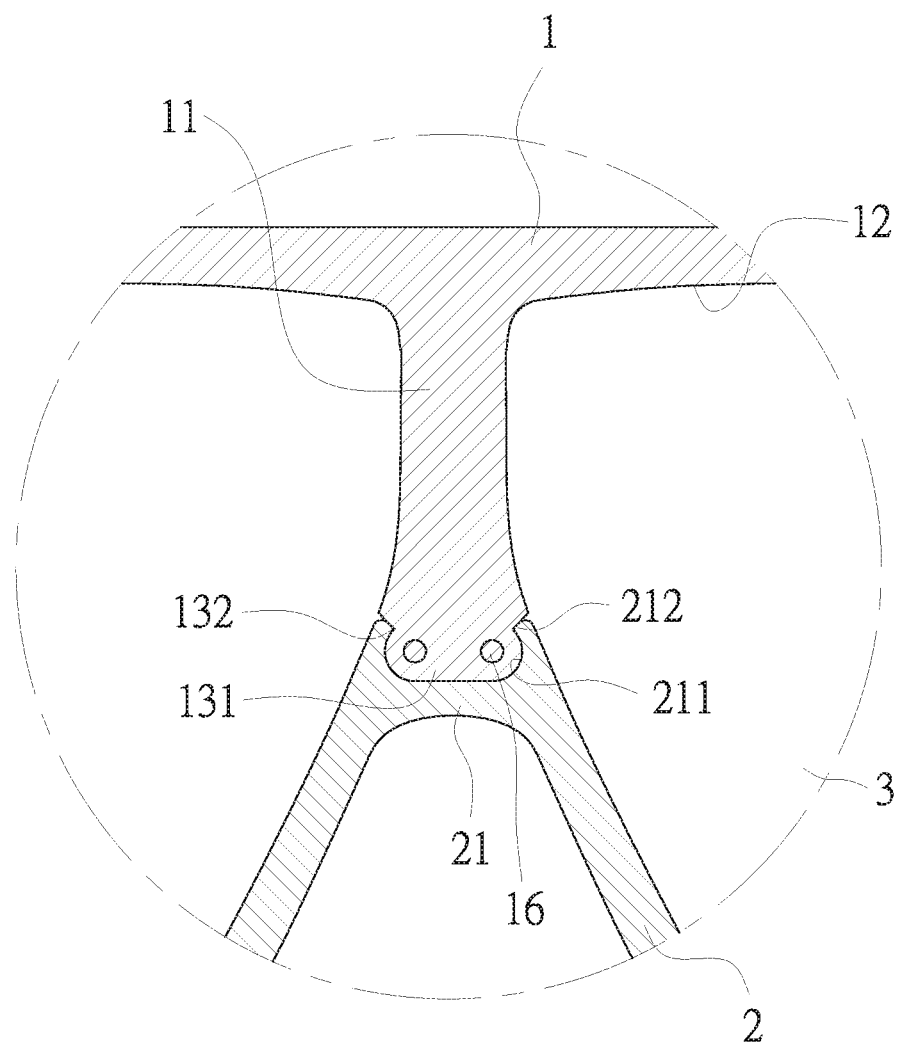
FIG. 5 is a partial section view of an interchangeable frame for eyeglasses when it is assembled according to an embodiment of the present invention.

The upper frame 1 comprises a middle section 11. Two upper lens-assembling portions 12 are formed at the both sides of the middle section 11 and opened at the lower portion of each upper lens-assembling portion 12, and a joining portion 13 is concavely formed at the front bottom of the middle section 11. A connection block 131 is connected with the bottom of the joining portion 13, and each of the both sides of the connection block 131 is formed with a ditch 132. Moreover, an inverted V-shaped fastener 14 is set on the joining portion 13, and two nose stands 15 are set between the fastener 14 and the connection block 131 of the joining portion 13. In addition, the middle section 11 is formed with two third locking holes 111, which are corresponded to the back of the connection block 131 of the joining portion 13, and the back of the fastener 14 is formed with two first locking holes 141, which are corresponded to the two third locking holes 111 of the middle section 11. A second locking hole 151 is formed in the upper end of each nose stand 15, corresponding to the third locking hole 111 of the middle section 11 and the first locking hole 141 of the fastener 14. Furthermore, as shown in FIG. 3 and FIG. 5, two latches 16 are respectively passed through the third locking holes 111 in the middle section 11 and the second locking holes 151 in the nose stands 15, and then screwed into the first locking holes 141 in the fastener 14 for fastening the nose stands 15 and the fastener 14 onto the middle section 11. The front end of each of the nose stands 15 is concavely formed with a gap 152 for receiving one of the sides of the inverted V-shaped fastener 14.

An inverted V-shaped assembling part 21 is formed at the middle of the lower frame 2 and connected with the joining portion 13 of the upper frame 1. A connection notch 211 is concavely formed at the upper end of the assembling part 21 to connect with the connection block 131 at the bottom of the joining portion 13. Two flanges 212 are respectively formed at the both sides of the connection notch 211 to engage in the ditches 132 at the both sides of the connection block 131. In addition, two lower lens-assembling portions 22 are formed at the both sides of the assembling part 21 of the lower frame 2 and opened at the upper portion of each lower lens-assembling portion 22 to pair with the two upper lens-assembling portions 12 of the upper frame 1 for forming a complete lens-assembling part.

Accordingly, when the interchangeable frame for eyeglasses of the present invention is assembled, two temples are respectively assembled to the both sides of the upper frame 1, and two lenses 3 are respectively assembled to the upper lens-assembling portions 12 of the upper frame 1, at this time, the bottom edge of the lenses 3 is exposed from the bottom of the upper lens-assembling portions 12 of the upper frame 1, forming a semi-rim eyeglasses. Then, the two nose stands 15 are corresponded to the both sides of the inverted V-shaped fastener 14 and against the side of the lenses 3 to locate. When the user does outdoor activities or construction, the design of the weight of the semi-rim eyeglasses is lithe for reducing the weight of the eyeglasses that presses on the user's nose and ear, improving the wear comfort. With the cool and neat appearance of the semi-rim eyeglasses, the user's fashionable and trendy appearance is improved.

Figure 4:
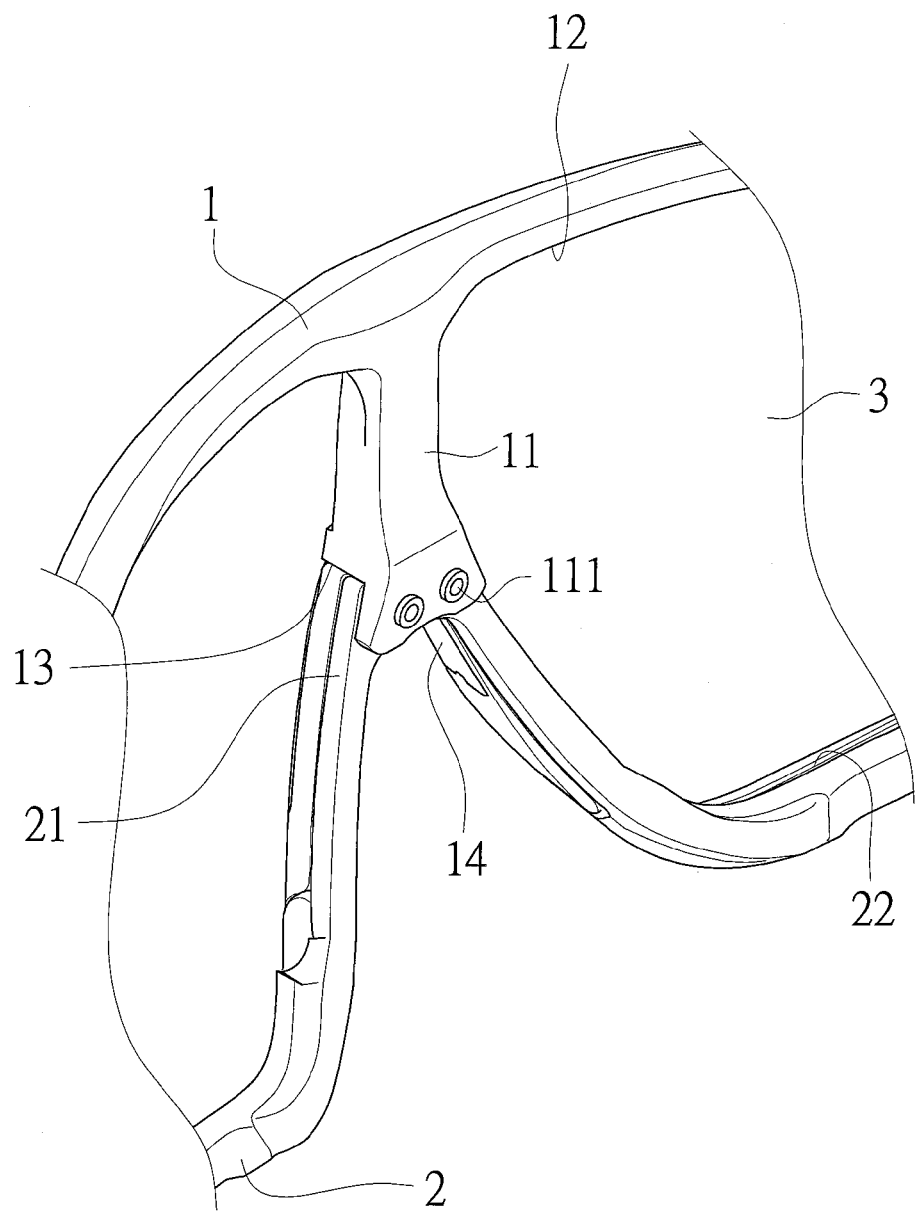
FIG. 4 is a three-dimensional view of an interchangeable frame for eyeglasses when it is assembled according to an embodiment of the present invention.

Moreover, when the safety and stability of the lens assembly are improved, please refer to FIG. 3 and FIG. 4, the lower frame 2 is assembled to the upper frame 1. When the lower frame 2 is assembled, the connection notch 211 of the upper end of the assembling part 21 of the lower frame 2 is connected to the connection block 131 at the bottom of the joining portion 13 of the upper frame 1, and the flanges 212 formed at the both sides of the connection notch 211 are engaged to the ditchs 132 at the both sides of the connection block 131, shown as FIG. 5. At this time, the exposed part of the two lenses 3, which is exposed from the bottom of the upper lens-assembling portions 12 of the upper frame 1, is corresponded to assemble to the two lower lens-assembling portions 22 of the lower frame 2 for forming the full-rim eyeglasses. Accordingly, the lenses 3 are hold by the upper and lower lens-assembling portions 12, 22 of the upper frame 1 and the lower frame 2 to improve the safety and the stability of the lens assembly. It indeed prevents the unexpected dropping situation, and the full-rim eyeglasses improve the user's steady when it is used for dressing up.

Therefore, due to the structure design of the interchangeable frame for eyeglasses of the present invention, according to the required, it can be assembled and disassembled freely to form the semi-rim eyeglasses or the full-rim eyeglasses. Furthermore, the upper frame 1 and the lower frame 2 can be different color and pattern for improving the fashion and trendy of its appearance. For the users who like novel and changeable things, they do not need to buy different type of eyeglasses, such as semi-rim eyeglasses and full-rim eyeglasses, also not need to assemble the lenses to the every semi-rim eyeglasses and full-rim eyeglasses, greatly saving the cost of buying glasses. For the eyeglasses industry, when the eyeglasses are displayed for sale, it does not need to display the all kinds of the semi-rim eyeglasses and the full-rim eyeglasses for consumers choosing, lightening the operating cost.

However, the foregoing embodiments and drawings does not limits the interchangeable frame for eyeglasses of the present invention, it will be obvious to those skilled in the art that various modifications may be made without departing from the spirit and the scope of the present invention.

What is claimed is:

1. An interchangeable frame for eyeglasses, comprising:
   an upper frame, including:
      a middle section;
      two upper lens-assembling portions respectively formed at opposed sides of the middle section each configured along a lower portion thereof to engage a first edge of a lens;
      a joining portion formed defining a recess at the front bottom of the middle section; and
      a connection block protruding from the joining portion to define two ditches, respectively, at opposed sides thereof;
   a fastener engaging the middle section of the upper frame for capturing the lens thereagainst; and
   a lower frame optionally coupled to the upper frame, including:

an inverted V-shaped assembling part, formed at the middle of the lower frame and connected with the joining portion of the upper frame;

a connection notch, concavely formed at the upper end of the assembling part to connect with the connection block at the bottom of the joining portion;

two flanges respectively formed at opposed sides of the connection notch to engage the ditches at the opposed sides of the connection block; and two lower lens-assembling portions formed at opposed sides of the assembling part each configured along an upper portion thereof to engage a second edge of the lens and thereby pair with the two upper lens-assembling portions of the upper frame for forming a complete lens-assembling part;

wherein the upper frame is selectively configurable between semi-rim and full-rim eyeglass configurations, the upper frame in the semi-rim eyeglass configuration retaining the lens without the lower frame coupled thereto.

2. The interchangeable frame for eyeglasses according to claim 1, the upper frame wherein:

the fastener is formed with an inverted V-shape, the fastener being set on the joining portion of the upper frame and formed with two first locking holes in the back of the fastener;

two nose stands are set between the fastener and the connection block of the joining portion, each of the nose stands being formed with a second locking hole in an upper end thereof;

two third locking holes are formed in the middle section and correspond to the back of the connection block of the joining portion, wherein the third locking holes correspond to the two first locking holes in the fastener and the second locking holes in the nose stands; and two latches are passed through the third locking holes in the middle section, the second locking holes in the nose stands, and screwed into the first locking holes in the fastener for securing the nose stands and the fastener onto the middle section.

3. The interchangeable frame for eyeglasses according to claim 2, wherein the front end of each of the nose stands is formed with a gap for receiving one side of the inverted V-shaped fastener.

* * * * *